(12) United States Patent
Cocchi et al.

(10) Patent No.: US 8,869,540 B2
(45) Date of Patent: Oct. 28, 2014

(54) MACHINE FOR PRODUCING LIQUID AND SEMI-LIQUID FOOD PRODUCTS WITH A CONTINUOUS CYCLE

(75) Inventors: Gino Cocchi, Bologna (IT); Gianni Zaniboni, Borgonuovo di Sasso Marconi (IT); Roberto Lazzarini, Reggio Emilia (IT)

(73) Assignee: Carpigiani Group—Ali S.p.A. (IT)

( * ) Notice: Subject to any disclaimer, the term of this patent is extended or adjusted under 35 U.S.C. 154(b) by 1236 days.

(21) Appl. No.: 12/603,191

(22) Filed: Oct. 21, 2009

(65) Prior Publication Data

US 2010/0101235 A1 Apr. 29, 2010

(30) Foreign Application Priority Data

Oct. 29, 2008 (IT) .............................. BO20080078 U (51) Int. Cl.
| F25D 3/08 | (2006.01) |
| F25C 1/18 | (2006.01) |
| A23G 9/00 | (2006.01) |
| A23G 9/22 | (2006.01) |
| A23G 9/16 | (2006.01) |

(52) U.S. Cl.
CPC ....... *A23G 9/22* (2013.01); *A23G 9/222* (2013.01); *A23G 9/166* (2013.01); *A23G 9/16* (2013.01)
USPC ........................................ 62/1; 62/342; 62/68

(58) Field of Classification Search
CPC ......... A23G 9/045; A23G 9/222; A23G 9/04; A23G 9/30; F25C 2301/002; A23L 3/36; A23L 3/375
USPC ................................................. 62/1, 68, 342
See application file for complete search history.

(56) References Cited

U.S. PATENT DOCUMENTS

| 1,883,109 A | 10/1932 | Thompson |
| 3,764,238 A | 10/1973 | Carpigiani |
| 5,349,825 A | 9/1994 | Duke |
| 5,419,150 A | 5/1995 | Kaiser |

(Continued)

FOREIGN PATENT DOCUMENTS

| DE | 4429077 | 2/1996 | |
| EP | 701777 A2 * | 3/1996 | ............... A23G 9/16 |
| EP | 1524196 | 4/2005 | |

OTHER PUBLICATIONS

European Search Report dated Mar. 9, 2010 from corresponding patent application.

*Primary Examiner* — Marc Norman
*Assistant Examiner* — Filip Zec
(74) *Attorney, Agent, or Firm* — Timothy J. Klima; Shuttleworth & Ingersoll, PLC (57) ABSTRACT

A machine for producing liquid and semi-liquid food products with a continuous cycle comprises a containment tank (5) for basic liquid or semi-liquid food products comprising an outfeed hole (6), a whipping and freezing cylinder (2) having an infeed for the basic food products connected to the tank (5) outfeed hole (6), and comprising a mixer for whipping and freezing of the basic food products and for obtaining an end product, a pump (7) acting in the containment tank (5) and comprising an intake duct (8) for drawing the basic food products from the tank (5) and a delivery duct (9) for transferring the drawn products towards the tank (5) outfeed (6). The machine also comprises a flexible delivery pipe (11) connected to the pump (7) delivery duct (9) and to the tank (5) outfeed (6).

12 Claims, 6 Drawing Sheets

(56) References Cited

U.S. PATENT DOCUMENTS

| | | | |
|---|---|---|---|
| 6,220,047 B1 * | 4/2001 | Vogel et al. | 62/342 |
| 6,490,872 B1 * | 12/2002 | Beck et al. | 62/66 |
| 6,637,214 B1 | 10/2003 | Leitzke | |
| 6,918,258 B2 * | 7/2005 | Cunha et al. | 62/68 |
| 2007/0295750 A1 * | 12/2007 | Cocchi et al. | 222/145.6 |

* cited by examiner

MACHINE FOR PRODUCING LIQUID AND SEMI-LIQUID FOOD PRODUCTS WITH A CONTINUOUS CYCLE

This application claims priority to Italian Patent Application No. BO2008U000078, filed Oct. 29, 2008, which application is incorporated by reference herein.

BACKGROUND OF THE INVENTION

This invention relates to a machine for producing liquid and semi-liquid food products with a continuous cycle.

In the context of this invention, the term machines for producing liquid and semi-liquid food products refers to machines for producing and processing crushed-ice drinks, sorbets, ice creams, soft ice creams, cream, yoghurt, creams and the like.

Said machines comprise a collection and/or reserve element for the starting food products (such as milk, cream, water and the like) which is connected to a whipping and freezing cylinder.

The collection and/or reserve element may be a container or tank, usually located above the whipping and freezing cylinder, or a "disposable" container made of cardboard or plastic, or of the "bag in box" type.

During machine operation, the starting food product is transferred to the whipping and freezing cylinder which processes the food products to produce the end product (for example, ice cream, yoghurt, creams, crushed-ice drinks).

The whipping and freezing cylinder is normally equipped with a mixer and comprises a shell in which a coolant fluid circulates.

The whipping and freezing cylinder is designed to mix, cool and blend together a plurality of ingredients to form a cream for ice cream, a crushed-ice drink or similar products.

One end of the whipping and freezing cylinder is fitted with a transit opening to which a finished product dispenser is usually connected.

The finished product, pushed by the mixer towards the whipping and freezing cylinder transit opening, is dispensed directly or through the dispenser.

In machines with a continuous cycle the whipping and freezing cylinder operates constantly, that is to say, it is always loaded with basic products which must be transformed into the end product.

For that purpose, each time a portion of finished product is extracted from the whipping and freezing cylinder, an equal volume of starting products must enter the whipping and freezing cylinder to substitute the load extracted.

In continuous cycle machines there are two prior art types of feed to the whipping and freezing cylinder.

A first type, called gravity feed, involves the basic starting products being transferred from the containment tank to the whipping and freezing cylinder substantially by gravity, that is to say, free fall.

A second type of feed, called pump feed, involves using suitable pumps which draw the basic product from the containment tank or from a "disposable" container referred to above and transfer it to the whipping and freezing cylinder.

In particular, pump systems involve the use of a pump which, if the tank is present, is in an upper portion of the tank, whilst if "disposable" containers are used, which are normally positioned inside a cooled compartment, the pump is also usually in the same refrigerated compartment.

The pump is equipped with an intake duct and a delivery duct.

Connected to the intake duct there is a drawing tube extending almost to the bottom of the tank for drawing basic liquid or semi-liquid product. In the case of "disposable" containers, it is fitted with an element able to pierce a container membrane and reach the product inside it to suck it out.

Connected to the delivery duct there is a rigid delivery pipe extending to the bottom of the tank, passing through a hole in it (fitted with seals to prevent liquid product from leaking from the hole) and arriving at an infeed of the whipping and freezing cylinder located below the tank.

In the case of "disposable" containers, said rigid pipe passes through the wall of the refrigerated compartment and arrives at the infeed of the whipping and freezing cylinder which is usually located above the compartment.

The latter type of configuration for continuous cycle machines has poor operating flexibility, since it requires the use of specific pumps for each machine.

For a particular machine for producing liquid or semi-liquid food products, for example a specific machine for producing ice cream, the whipping and freezing cylinder has a food product infeed in a very precise position.

Therefore, the tank used in said machine must have a transit hole for the pump delivery duct which is directly opposite the whipping and freezing cylinder infeed hole. The same disadvantage exists for the refrigerated compartment.

In both cases, a pump must be used which has a delivery duct located in such a way that it is precisely vertically aligned with the hole in the tank, and precisely vertically aligned with the hole in the wall of the refrigerated compartment, to allow the delivery pipe to connect the hole in the tank and the disposable container to the pump delivery duct.

In other words, a specific pump must be used for each type of machine.

This disadvantage is also reflected by high operating costs, since specific spare pumps must be available for each type of machine, making assembly inflexible and expensive.

Moreover, substitution of a faulty pump requires precise assembly with minimum tolerances to guarantee that the delivery pipe can be connected both to the pump delivery duct and to the whipping and freezing cylinder infeed.

This involves lengthy assembly and substitution times.

SUMMARY OF THE INVENTION

This invention therefore has for an aim to propose a machine for producing liquid and semi-liquid food products with a continuous cycle which is more effective and able to overcome the above-mentioned disadvantages.

Accordingly, this invention achieves that aim with a machine for producing liquid and semi-liquid food products with a continuous cycle having the technical features described herein.

BRIEF DESCRIPTION OF THE DRAWINGS

The technical features of the invention, with reference to the above aims, are clearly described below, and its advantages are more apparent from the detailed description which follows, with reference to the accompanying drawings which illustrate a preferred embodiment of the invention provided merely by way of example without restricting the scope of the inventive concept, and in which.

DESCRIPTION OF THE PREFERRED EMBODIMENTS

With reference to the accompanying drawings, the numeral 1 denotes as a whole a machine for producing liquid and semi-liquid food products with a continuous cycle according to this invention.

It must be emphasized that in this context, the term machines for producing liquid and semi-liquid food products refers to machines for producing and processing crushed-ice drinks, sorbets, ice creams, soft ice creams, cream, yoghurt, creams and the like.

Figure 1:
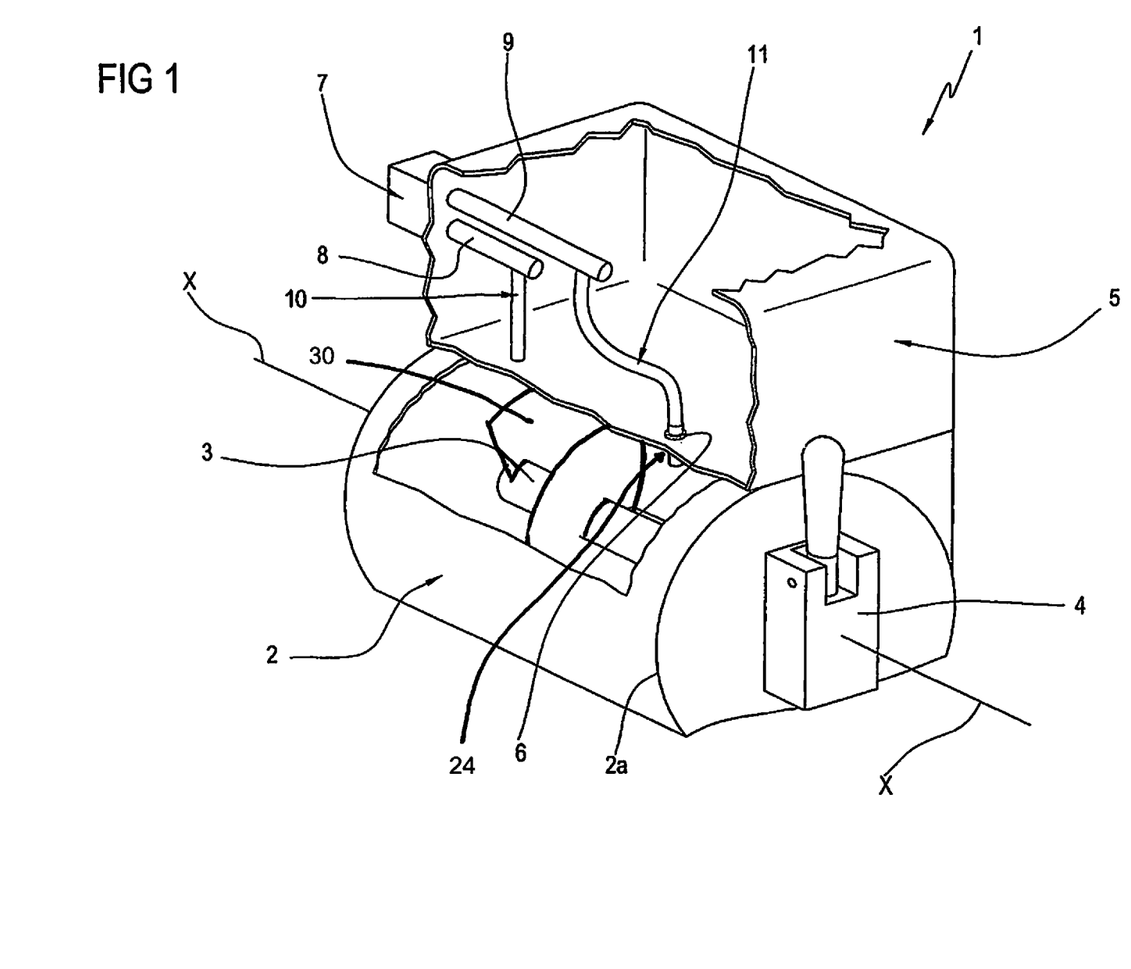
FIG. 1 is a perspective view, with some parts cut away to better illustrate others, of a first embodiment of a machine for producing liquid and semi-liquid food products with a continuous cycle made in accordance with this invention.
Figure 2:
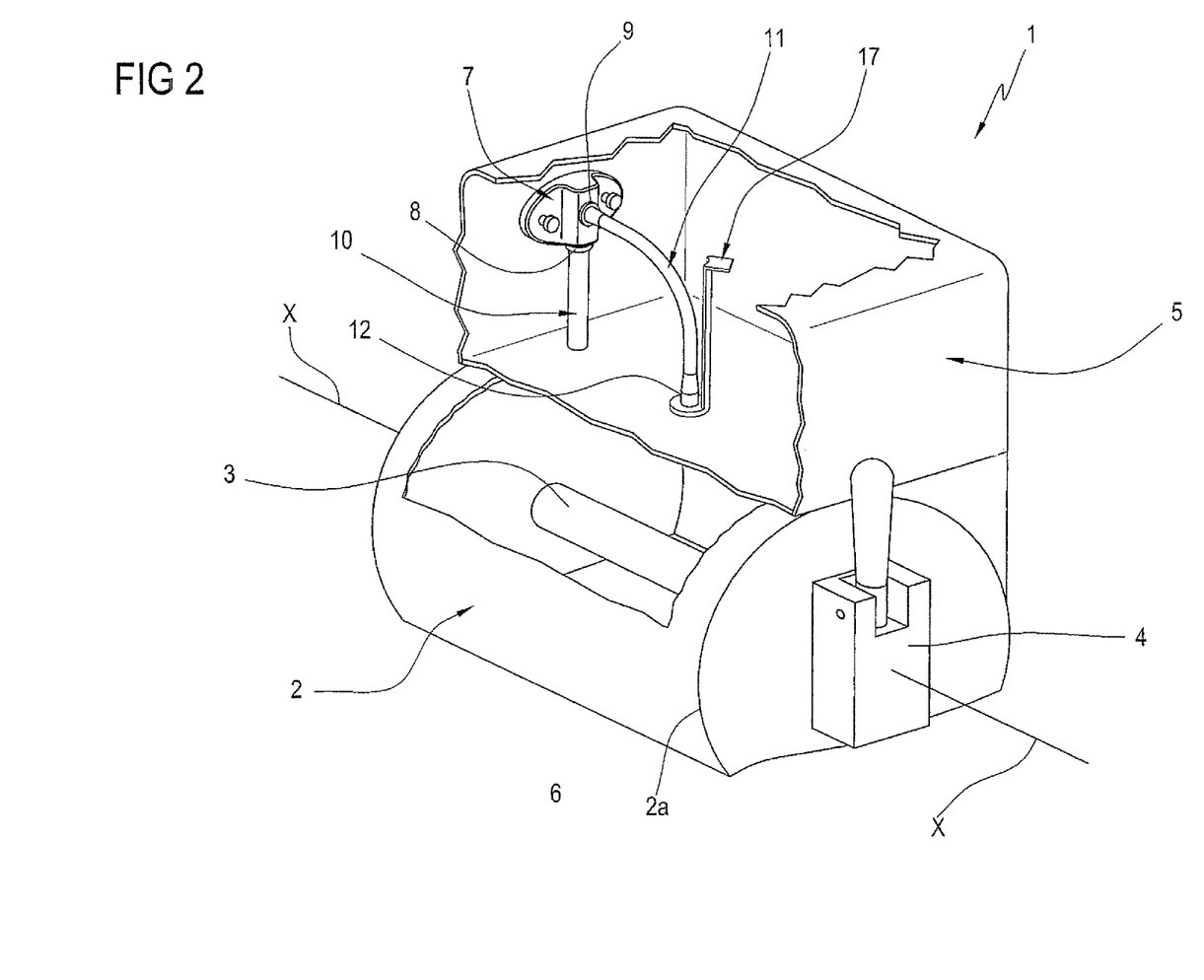
FIG. 2 is a perspective view of a preferred embodiment of the machine of FIG. 1.
Figure 6:
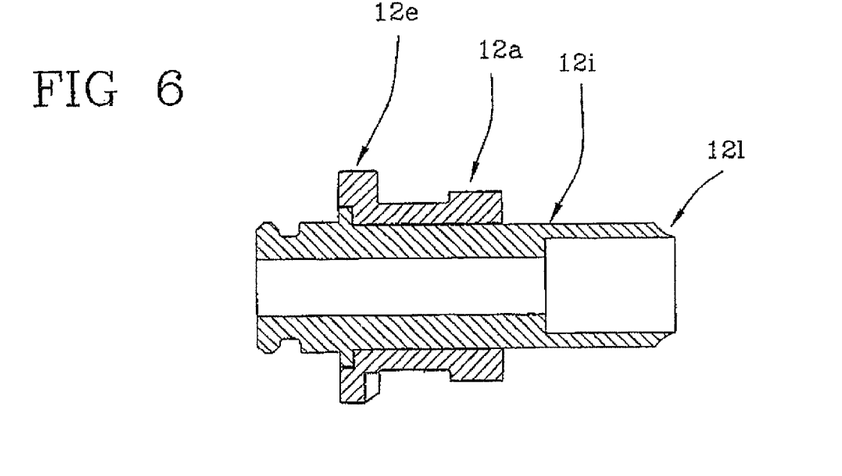
Figure 7:
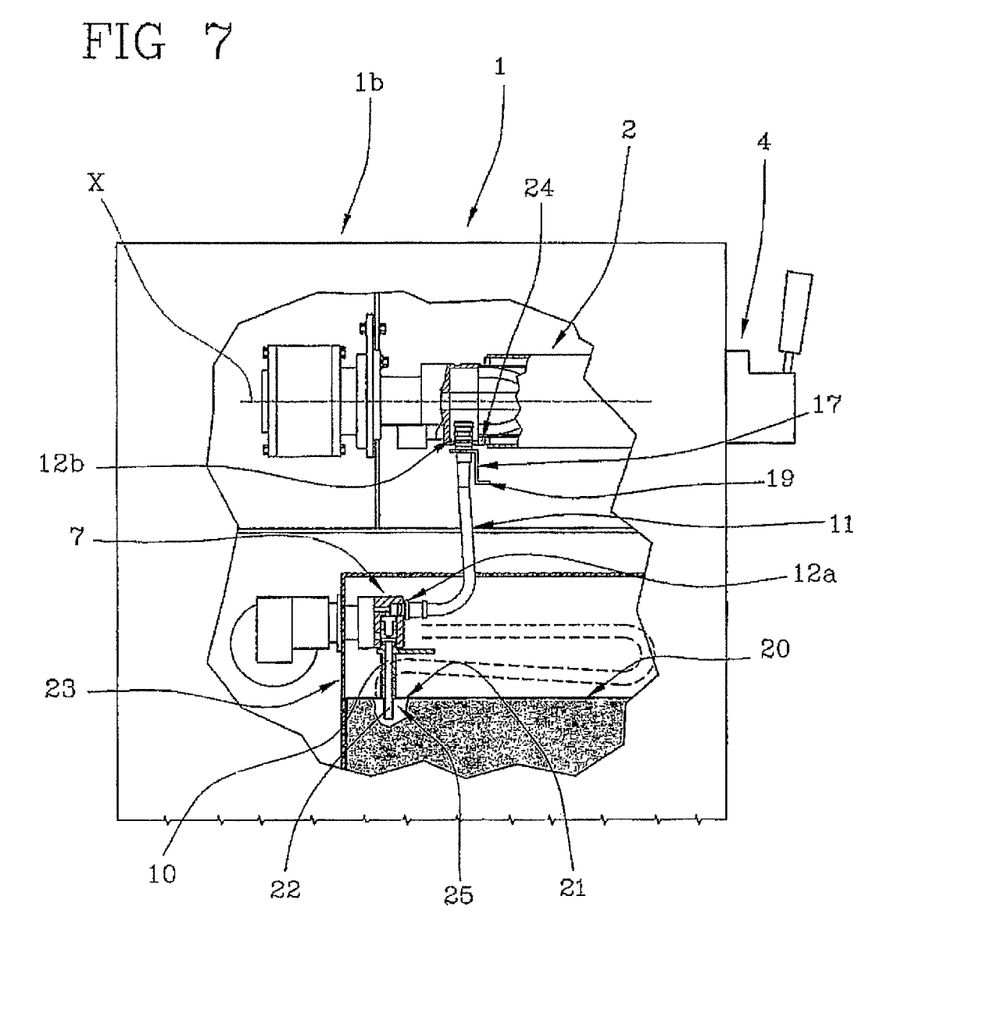
FIG. 7 is view, with some parts cut away, of a second embodiment of a machine for producing liquid and semi-liquid food products with a continuous cycle made in accordance with this invention.

Moreover, the machine 1 illustrated in FIGS. 1 and 2 is labeled 1a to distinguish it from the embodiment of FIG. 6 in which the machine 1 is labeled 1b.

With reference to FIG. 1, the machine 1-1a is of the type comprising a horizontal whipping and freezing cylinder 2 and comprises a containment frame in which the whipping and freezing cylinder 2 is housed.

The latter comprises a chamber, substantially cylindrical and made of stainless steel, having an axis X of extension which is substantially horizontal (FIG. 1). Inside the chamber there is a motor-driven mixer 30 (partially shown) able to rotate about the horizontal axis X of extension of the whipping and freezing cylinder 2 chamber and comprising a plurality of blades (FIG. 1 also shows the shaft 3 on which the mixer blades are fitted). Rotation of the mixer, and therefore of the blades, mixes the ingredients introduced into the whipping and freezing cylinder 2 and pushes the mass of food product being formed towards one end 2a of the whipping and freezing cylinder 2.

The whipping and freezing cylinder is preferably equipped with a jacket in which a coolant fluid flows for keeping the temperature of the whipping and freezing cylinder 2 and of the mixture contained in it within a specific temperature range.

The whipping and freezing cylinder 2 is designed to mix, cool and blend together a plurality of ingredients to form a cream for ice cream, a crushed-ice drink or similar products.

At the above-mentioned end 2a of the whipping and freezing cylinder 2 there is a transit opening (not illustrated) to which a finished product dispenser 4 is connected.

The finished product, pushed by the mixer towards the whipping and freezing cylinder 2 transit opening, is dispensed, on demand, through the dispenser 4.

The machine 1-1a comprises a collection and reserve element consisting of a containment tank 5 for containing the basic food products which will be processed to produce the finished product.

The tank 5 is equipped with an infeed opening for the basic products (not illustrated) which may be fitted with a lid. There is also an outfeed hole 6 on the bottom of the tank 5 for the passage of the basic food products towards the whipping and freezing cylinder 2.

As illustrated in FIGS. 1 and 2, the tank 5 is preferably positioned above the whipping and freezing cylinder 2.

The machine 1 also comprises a pump 7 operating in the containment tank 5 and comprising an intake duct 8 for drawing the basic food products from the tank 5 and a delivery duct 9 for transferring the drawn products towards the tank 5 outfeed 6. It should be noticed that the tank 5 outfeed 6 forms the whipping and freezing cylinder 2 infeed.

The pump 7 is preferably located in an upper portion of the tank 5 and is connected to the outside of the tank, as shown in FIG. 1.

FIG. 2 shows a preferred embodiment of the invention in which the pump 7 is a gear pump comprising two gear wheels rotating inside a containment box. The product contained in the tank is sucked by the voids which are created between the teeth of the two gear wheels and sent to the delivery duct when the teeth of the gear wheels mesh with each other.

During filling of the above-mentioned voids, air is sucked through a duct in such a way that the product sucked from the tank is mixed with air before it is sent to the whipping and freezing cylinder.

The pump 7 illustrated in FIG. 2 is described in detail in U.S. Pat. No. 3,764,238 by the same Applicant.

Irrespective of the type of pump 7 used, connected to the intake duct 8 there is an intake pipe 10 extending to a lower portion of the tank 5 for drawing basic liquid or semi-liquid food products from inside the tank 5.

Advantageously, the machine 1 comprises a flexible delivery pipe 11 connected to the pump 7 delivery duct 9 and to the tank 5 outfeed 6.

In this way, the pump 7 delivery duct 9 can be connected to the tank 5 outfeed hole 6 irrespective of the position of the two elements relative to each other, thus guaranteeing that any tank can easily and rapidly be connected to any pump.

In other words, the flexible delivery pipe 11 allows the pump 7 delivery duct 9 to be connected to the tank 5 outfeed hole 6 even when the delivery duct 9 and the hole 6 are not vertically aligned, as shown in FIG. 1.

The flexible delivery pipe 11 is preferably made of overmolded plastic material, thus guaranteeing the correct flexibility and sanitariness.

To guarantee rapid installation of the flexible delivery pipe 11 the latter comprises quick connectors 12 at its ends.

The quick connector 12a (FIG. 3) designed to engage with the pump 7 delivery duct 9 is preferably rigidly connected to the flexible pipe 11.

Figure 3:
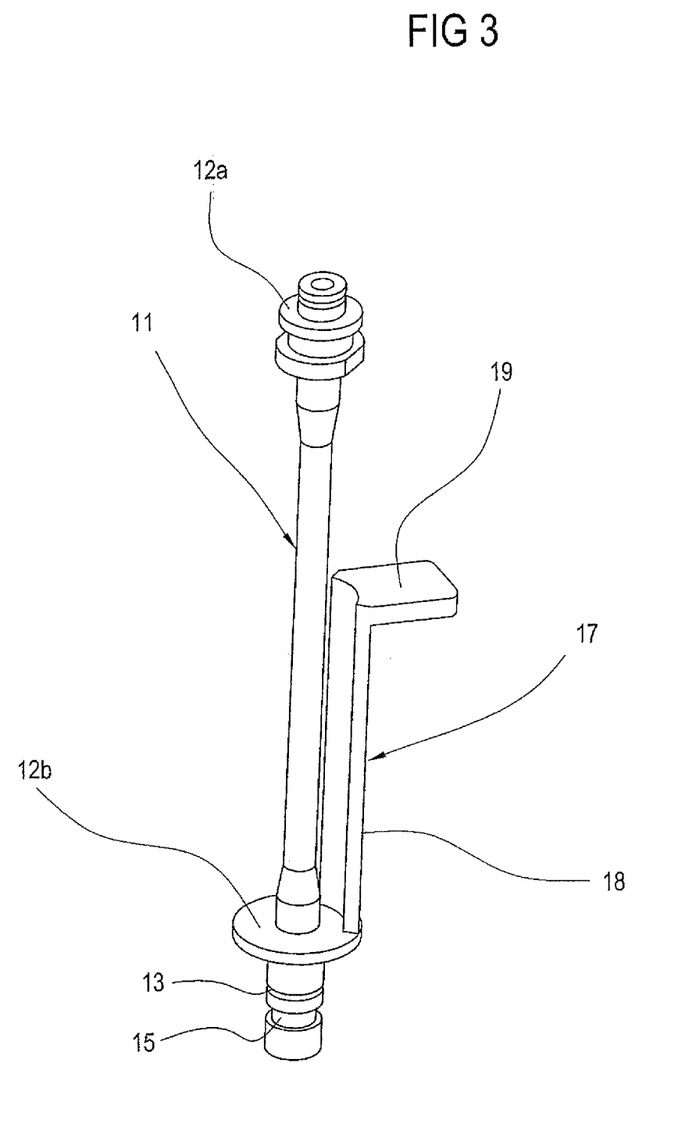
FIGS. 3 and 4 show a detail present both in the machine illustrated in FIG. 2 and in the machine illustrated in FIG. 6.

In particular, the quick connector 12a designed to engage with the delivery duct 9 is a bayonet type connector, that is to say, it can be engaged by rotating the entire flexible pipe 11 relative to the delivery duct 9.

Figure 5:
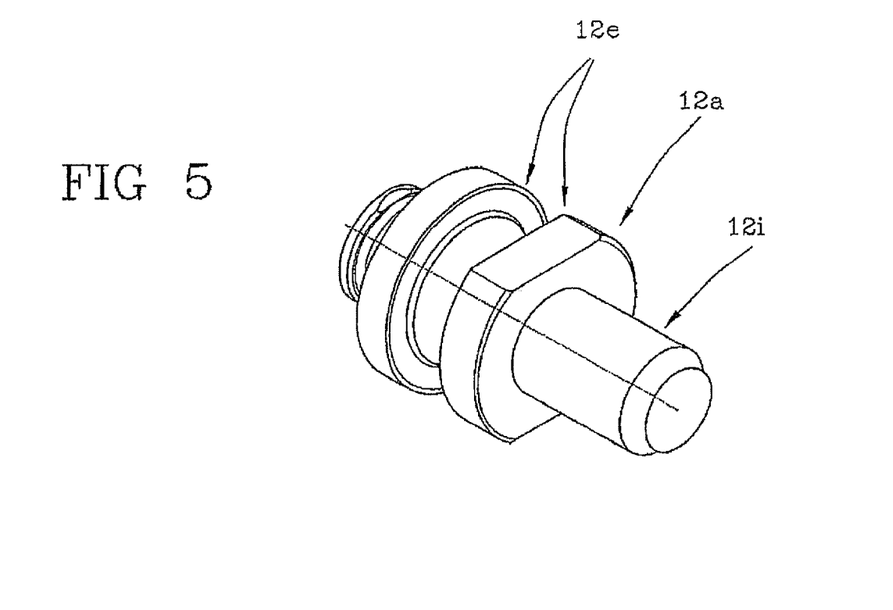
FIGS. 5 and 6 are respectively a perspective view and a longitudinal section of a construction detail of the detail illustrated in FIGS. 3 and 4.

As illustrated in FIGS. 5 and 6, the quick connector 12a comprises a tubular inner body 12i, axially pierced for the passage of the product and designed to be connected at one end, labeled 121, to the end of the flexible pipe 11, and an outer body 12e supporting the inner body 12i with the possibility of reciprocal rotation. In this way, any problems of flexible pipe 11 axial distortion during its assembly are avoided.

Figure 4:
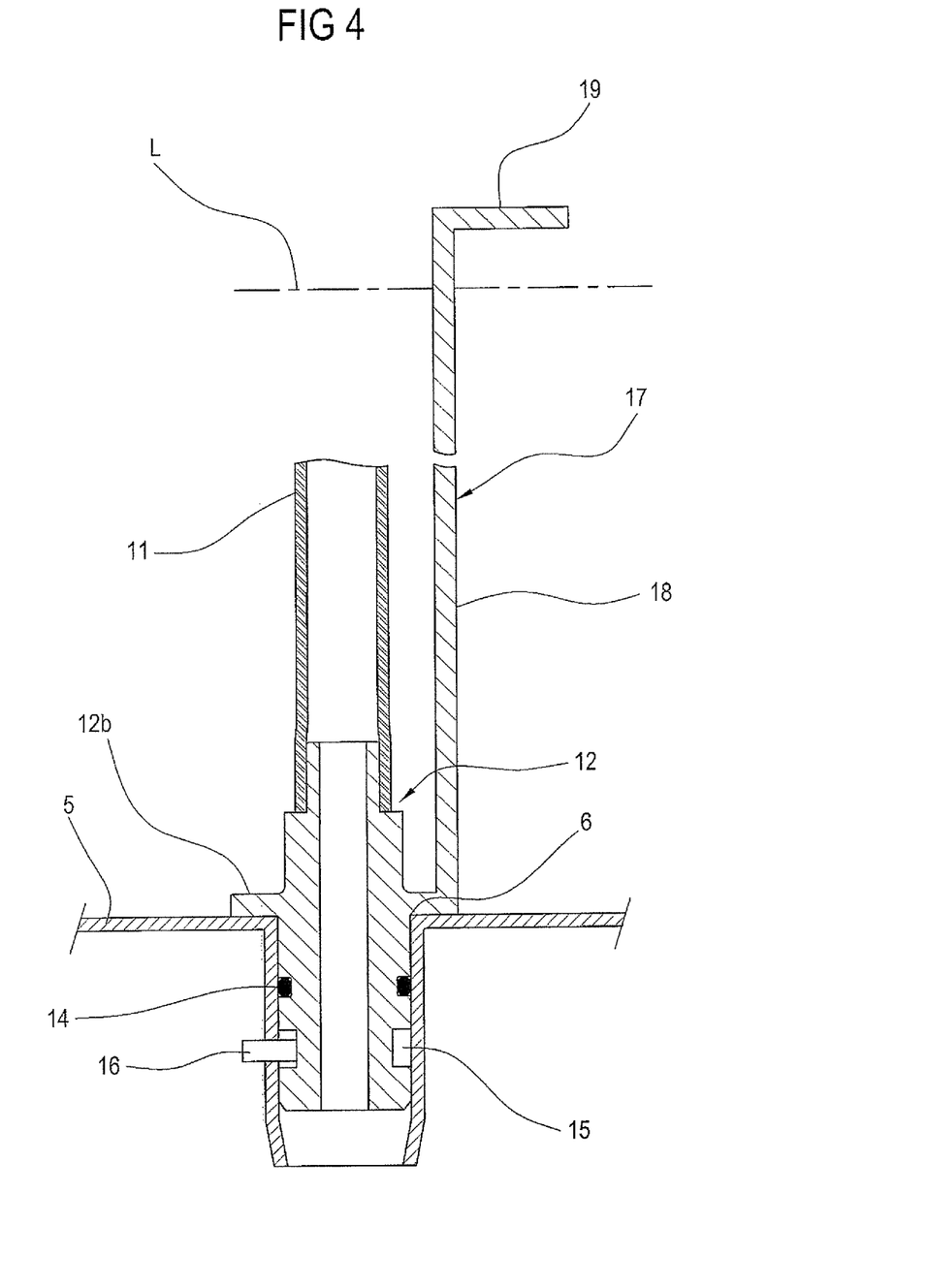

The quick connector 12b designed to engage with the tank 5 outfeed 6 preferably comprises an undercut 13 intended to receive a toroidal seal 14 able to couple in a fluid-proof fashion with the hole 6 in the tank 5, as shown in FIG. 4.

The quick connector 12b also comprises another undercut 14 intended to couple with a projection 16 present in the hole 6 in the tank 5 (FIG. 4).

The undercut 15 and the projection 16 axially constrain the flexible pipe 11 to the tank 5.

The projection 16 is made to engage in the undercut 15 under pressure. That is to say, the quick connector 12b is pressed into the hole 6 in the tank 5.

The flexible pipe 11 also comprises handling means 17 (FIGS. 3 and 4).

The handling means 17 are designed to allow removal of the pipe 11 from the tank 5 even when the tank 5 is full of liquid and without the operator responsible for removing the pipe 11 making contact with the liquid contained in the tank.

In particular (see FIG. 4), the handling means 17 comprise a rod-shaped element 18 extending from the quick connector 12b intended to engage in the hole 6 in the tank and away from it.

The handling means 17 also comprise a handgrip 19 extending at one end of the rod-shaped element 18, so that the handgrip 19 remains at a distance from the bottom of the tank 5 such that it guarantees that the handgrip is always above the surface L of the liquid contained in the tank 5.

The handling means 17 act directly on the quick connector 12b so that it can be detached from the tank 5 by acting directly on the handgrip 21.

As described above, the flexible pipe 11 is first connected to the pump 7 delivery duct 9 using the bayonet connector.

Then, the flexible pipe 11 is bent until the end bearing the quick connector 12 is aligned with the outfeed hole 6 in the tank 5.

At this point, the quick connector 12b is pressed into the hole 6 by applying suitable pressure using the handling means 17, so that the quick connector 12b is inserted in the hole 6 and constrained to it.

The invention achieves the preset aims.

The flexible pipe 11 allows the pump to be connected to the whipping and freezing cylinder irrespective of the position of the tank 5 outfeed hole 6 and of the pump 7 delivery duct 9.

This allows practically any pump to be used to send the basic food products to the whipping and freezing cylinder, without requiring specific pump geometries.

Moreover, flexible pipe 11 removal and installation is fast and easy.

According to the embodiment illustrated in FIG. 6, the machine 1 is labeled 1b as a whole and, like that illustrated in FIGS. 1 and 2, is of the type comprising a horizontal whipping and freezing cylinder 2 having an axis X of extension which is substantially horizontal, inside whose chamber there is a motor-driven mixer able to rotate about the horizontal axis X of extension of the whipping and freezing cylinder 2 chamber of the type described for the embodiment of FIG. 1.

At the end of the whipping and freezing cylinder 2 there is a transit opening (not illustrated) to which a finished product dispenser 4 is connected.

The machine 1-1a comprises a collection and reserve element consisting of a "disposable" container made of cardboard or plastic or of the "bag in box" type, labeled 20 and having a zone equipped with a membrane 21 which can be pierced by a wedge or needle 22 fitted on the pump 7 intake pipe 10, thus forming a product outfeed hole 25.

The intake pipe and the container 20 are positioned in a refrigerated compartment 23 located below the whipping and freezing cylinder 2.

Similarly to the machine 1a, the machine 1b also comprises a flexible delivery pipe 11 identical to that described for machine 1a, and which in the case in question is connected to the pump 7 delivery duct 9 and to the whipping and freezing cylinder 2 infeed 24.

In this way, in this case too, the pump 7 delivery duct 9 can be connected to the whipping and freezing cylinder infeed hole 24 irrespective of the position of the two elements relative to each other, guaranteeing fast, easy assembly and connection for any pump and any whipping and freezing cylinder.

The invention described above is susceptible of industrial application and may be modified and adapted in several ways without thereby departing from the scope of the inventive concept. Moreover, all details of the invention may be substituted by technically equivalent elements.

What is claimed is:

1. A machine for producing liquid and semi-liquid food products with a continuous cycle comprising:
   a containment tank for directly containing basic liquid or semi-liquid food products comprising an outfeed hole;
   a whipping and freezing cylinder having an infeed for the basic food products, the infeed positioned below the containment tank and in communication with the outfeed hole, the whipping and freezing cylinder comprising a mixer for whipping and freezing of the basic food products and for obtaining an end product;
   a pump comprising an intake duct for drawing the basic food products from the containment tank and a delivery duct for transferring the drawn products towards the whipping and freezing cylinder infeed;
   a flexible delivery pipe positioned in the containment tank and connecting the pump delivery duct to the outfeed hole;
   wherein the outfeed hole includes a tubular portion which extends through the whipping and freezing infeed such that the connection of the pump delivery duct to the outfeed hole by the flexible delivery pipe places the pump delivery duct in communication with the whipping and freezing cylinder;
   a fluid-proof seal engaging between the flexible delivery pipe and the outfeed hole tubular portion to isolate the basic liquid or semi-liquid food products in the containment tank from the whipping and freezing cylinder except via the pump and flexible delivery pipe;
   wherein the flexible delivery pipe allows a fluid tight connection between the pump delivery duct and the outfeed hole within a range of variable positioning of the pump delivery duct with respect to the outfeed hole.

2. The machine according to claim 1, wherein the pump delivery duct and the outfeed hole or the whipping and freezing cylinder infeed are not vertically aligned with each other.

3. The machine according to claim 1, wherein the flexible delivery pipe is made of overmolded plastic material.

4. The machine according to claim 1, wherein the flexible delivery pipe comprises quick connectors at opposite ends of the flexible delivery pipe for connecting the pipe to the pump delivery duct and to the tank outfeed hole.

5. The machine according to claim 4, wherein the quick connector engaging the outfeed hole comprises an undercut to engage a projection in the outfeed hole.

6. The machine according to claim 5, wherein the undercut connects to the projection with a snap-on action, axially constraining the flexible pipe to the tank or to the whipping and freezing cylinder.

7. The machine according to claim 6, wherein the flexible pipe comprises a handling mechanism acting directly on the quick connector for connecting and detaching the quick connector to/from the tank by acting on a handgrip, the handgrip being positioned at a height in the tank higher than a recommended maximum level of liquid or semi-liquid in the tank.

8. The machine according to claim 7, wherein the quick connector engaging the pump delivery duct is rigidly connected to the flexible delivery pipe.

9. The machine according to claim 4, wherein the quick connector comprises a tubular inner body, axially pierced for passage of the basic food products and designed to be connected at one end to the end of the flexible pipe, and an outer body supporting the inner body providing for reciprocal rotation.

10. The machine according to claim 1, and further comprising an intake pipe connected to the pump intake duct.

11. The machine according to claim 10, wherein the intake pipe comprises a free, drawing end inside the tank.

12. The machine according to claim 10, wherein the intake pipe comprises a free end equipped with a pierced wedge or needle for piercing a zone of the container equipped with a membrane to form an outfeed hole for the product contained in the container.

\* \* \* \* \*